United States Patent
Cho et al.

(10) Patent No.: US 7,440,211 B2
(45) Date of Patent: Oct. 21, 2008

(54) APPARATUS AND/OR METHOD OF CONTROLLING TIMING OF SERVO PULSES AND DISK DRIVE USING THE METHOD

(75) Inventors: Jae-deog Cho, Suwon-si (KR); Sang-hun Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 89 days.

(21) Appl. No.: 11/129,390

(22) Filed: May 16, 2005

(65) Prior Publication Data

US 2005/0264918 A1    Dec. 1, 2005

(30) Foreign Application Priority Data

May 28, 2004  (KR) .................. 10-2004-0038192

(51) Int. Cl.
  *G11B 5/09* (2006.01)
(52) U.S. Cl. .......................... 360/51; 360/53
(58) Field of Classification Search ............... None
  See application file for complete search history.

(56) References Cited

U.S. PATENT DOCUMENTS

| 4,424,543 | A | | 1/1984 | Lewis et al. ............ 360/135 |
|---|---|---|---|---|
| 4,783,705 | A | | 11/1988 | Moon et al. ............ 360/77.08 |
| 4,841,384 | A | | 6/1989 | Murakami et al. ........ 360/60 |
| 5,307,216 | A | * | 4/1994 | Cook et al. ............ 360/72.1 |
| 6,081,397 | A | * | 6/2000 | Belser ................. 360/51 |
| 6,229,660 | B1 | | 5/2001 | Chung ................. 360/51 |
| 6,560,718 | B1 | * | 5/2003 | Wilson ................. 714/5 |
| 6,583,944 | B1 | * | 6/2003 | Wilson et al. ........... 360/51 |
| 7,126,776 | B1 | * | 10/2006 | Warren et al. ........... 360/51 |
| 2003/0218823 | A1 | * | 11/2003 | Dang et al. .......... 360/77.08 |
| 2005/0174672 | A1 | * | 8/2005 | Kim .................. 360/51 |
| 2005/0201236 | A1 | * | 9/2005 | Jun ................. 369/53.14 |
| 2006/0176599 | A1 | * | 8/2006 | Semba ................. 360/51 |

FOREIGN PATENT DOCUMENTS

| JP | 8-31103 | 2/1996 |
|---|---|---|
| JP | 8-321142 | 12/1996 |
| JP | 2003-45129 | 2/2003 |

* cited by examiner

*Primary Examiner*—William J. Klimowicz
*Assistant Examiner*—Dan I Davidson
(74) *Attorney, Agent, or Firm*—Staas & Halsey LLP

(57) ABSTRACT

Provided is a method and apparatus for adaptively controlling the timing of servo pulses in a disk drive in consideration of the amount of spindle jitter generated when a disk rotation speed is changed. The method of controlling the timing of a sector pulse for write operation includes: measuring a spindle jitter value in a data write mode; generating a timing correction value of a sector pulse, which indicates a position of a sector where data is written, according to the measured spindle jitter value; and generating a sector pulse by reflecting the timing correction value of the sector pulse.

8 Claims, 8 Drawing Sheets

FIG. 2A  NORMAL SERVO GATE & SIGNAL

FIG. 2B  SPIN JITTER − SERVO GATE & SIGNAL

FIG. 2C  SPIN JITTER + SERVO GATE & SIGNAL

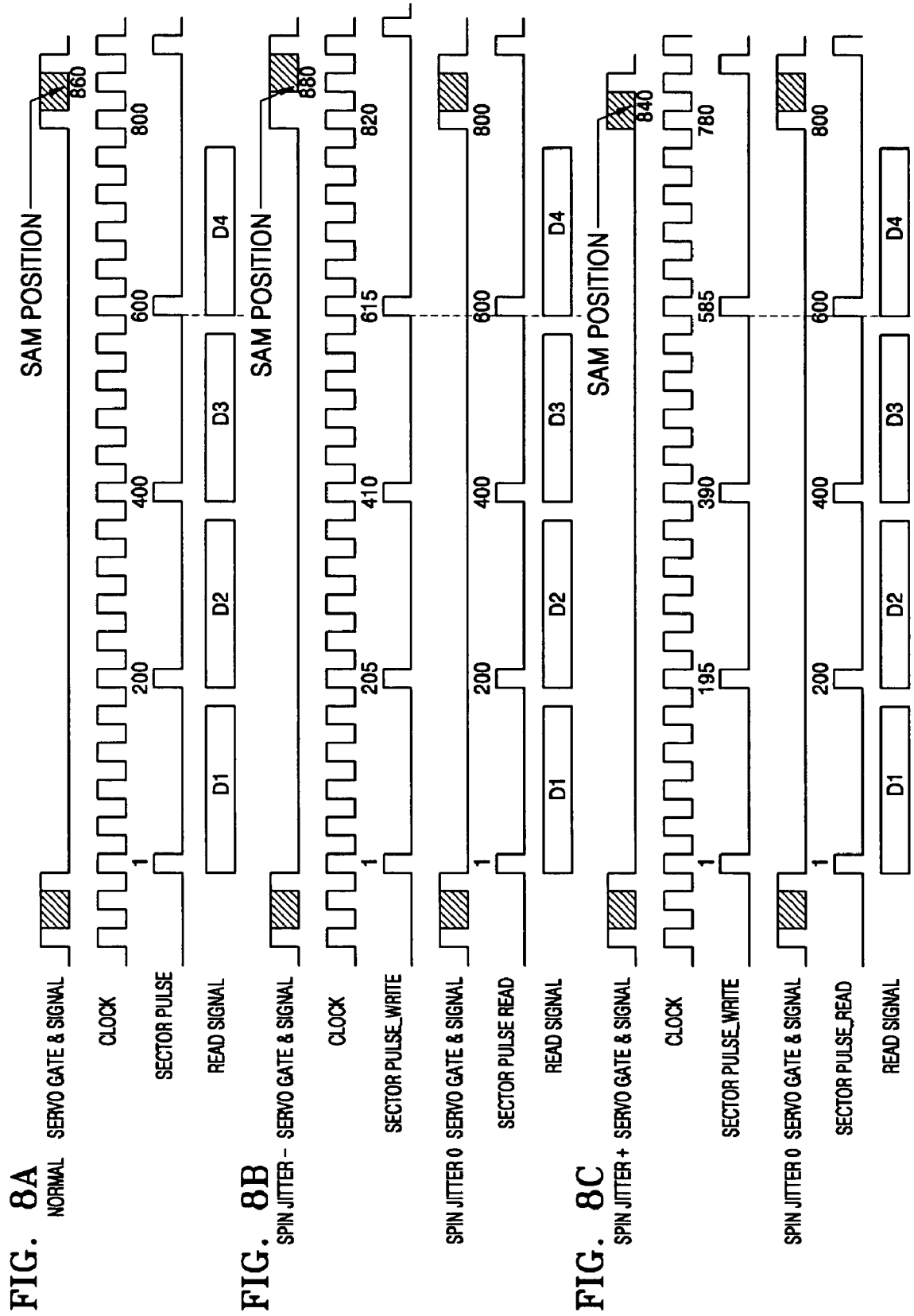

APPARATUS AND/OR METHOD OF CONTROLLING TIMING OF SERVO PULSES AND DISK DRIVE USING THE METHOD

CROSS-REFERENCE TO RELATED APPLICATION

This application claims the benefit of Korean Patent Application No. 10-2004-0038192, filed on May 28, 2004, in the Korean Intellectual Property Office, the disclosure of which is incorporated herein in its entirety by reference.

BACKGROUND OF THE INVENTION

1. Field of the Invention

The present invention relates to a method and apparatus for controlling the timing of servo pulses in a disk drive, and more particularly, to a method and apparatus for adaptively controlling the timing of servo pulses in consideration of the amount of jitter generated when a rotational speed of a disk is changed.

2. Description of the Related Art

In general, hard disk drives (HDDs) used in computer systems are data storage devices that reproduce data recorded on a disk or record data on the disk using a magnetic head. As the capacity, density, and size of HDDs increase, bits per inch (BPI), which are a measure of the recording density in a rotational direction of a disk, and tracks per inch (TPI), which are a measure of the recording density in a radial direction of the disk, are also increasing. Accordingly, HDDs require a more delicate mechanism.

HDDs read servo information at regular time intervals from a disk, which rotates at a constant speed, using a transducer (referred to as a head), identify a location of a data sector based on the read servo information, and perform write or read operation.

Referring to FIG. 1, a pattern of servo information recorded on a disk of an HDD contains a preamble, a servo address/index mark SAM/SIM, a gray code, and burst signals A, B, C, and D.

The preamble has a gap before a servo sector, thereby providing a constant timing margin. The SAM represents a starting point of the servo sector, and the SIM provides information on a revolution of the disk. The gray code provides identification (ID) information of each track, and the burst signals are used to control a position of a head.

If a disk rotation speed in the HDD is constant, servo information is detected at regular time intervals. However, if the HDD wobbles due to an external impact or the like and the disk rotation speed is changed, the timing at which the servo information is detected is changed. If a write operation is performed when the timing is changed, a position of a sector where data is written is also changed.

In general, the value of spindle jitter (or referred to as spin jitter) represents a difference between a current rotational speed of a disk and a target disk rotation speed. If a spindle jitter value is "0", the SAM is detected at regular time intervals. However, if it is not "0", the SAM is detected at shorter or longer intervals.

FIG. 2A illustrates that if data is recorded and reproduced when a spindle jitter value is "0", a position of a sector pulse and a position of a sector where the data is recorded or reproduced are exactly aligned.

FIG. 2B illustrates that if data is recorded when a spindle jitter value is a negative number and the data is reproduced when a spindle jitter value is 0, a position of a sector pulse for data read operation and a position of a sector where the data is recorded are misaligned.

FIG. 2C illustrates that if data is recorded when a spindle jitter value is a positive number and the data is reproduced when a spindle motor is "0", a position of a sector pulse for data read operation and a position of a sector where the data is recorded are misaligned.

Methods for correcting the timing of servo pulses including a sector pulse and a servo gate pulse according to the amount of generated spindle jitter have not been developed yet. Accordingly, if spindle jitter is excessively generated in a data write mode, data write operation cannot be performed normally. If data is written in this state, the possibility of errors increases in a data read mode since a position of a sector pulse and a position of a sector where the data is written are misaligned during reproduction.

Further, the possibility of errors increases even when spindle jitter is excessively generated in a data read mode, since a position of a sector pulse and a position of a sector where the data is written are misaligned.

Also, if the amount of spindle jitter is relatively large, a SAM signal exceeds a position of a servo gate pulse, resulting in a failure to detect the SAM signal normally.

SUMMARY OF THE INVENTION

Additional aspects and/or advantages of the invention will be set forth in part in the description which follows and, in part, will be apparent from the description, or may be learned by practice of the invention.

The present invention provides a method for controlling the timing of servo pulses including a sector pulse and a servo gate pulse to correct the servo pulses based on the amount of generated spindle jitter and perform stable write and read operation, and a disk drive using the method.

According to an aspect of the present invention, there is provided a method of controlling the timing of a sector pulse for write operation in a disk drive, the method including the operations of: measuring a spindle jitter value in a data write mode; generating a timing correction value of a sector pulse, which indicates a position of a sector where data is written, according to the measured spindle jitter value; and generating a sector pulse according to the timing correction value of the sector pulse.

According to another aspect of the present invention, there is provided a method of controlling the timing of a sector pulse for read operation in a disk drive, the method including the operations of: measuring a spindle jitter value in a data read mode; generating a timing correction value of a sector pulse, which indicates a position of a sector where data is read, according to the measured spindle jitter value; and generating a sector pulse according to the timing correction value of the sector pulse.

According to still another aspect of the present invention, there is provided a method of controlling the timing of a servo gate pulse in a disk drive, the method including: measuring a spindle jitter value in a data write mode and a data read mode; and correcting the timing of a servo gate pulse, which is used for obtaining servo information, according to the measured spindle jitter value.

According to yet another aspect of the present invention, there is provided a disk drive that is a data storage device, the disk drive including: a host interface, which transmits or receives data to or from a host device; a controller, which measures a spindle jitter value in a data write mode and a data read mode, and compensates for the timing of a predetermined servo control signal according to the measured spindle jitter value; and a writing/reading circuit, which writes data, which is received via the host interface, on a disk or reads data from the disk according to the predetermined servo control signal generated by the controller.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 8A through 8C are timing diagrams of major signals for explaining timing compensation of the sector pulse for write operation according to an aspect of the present invention.

DETAILED DESCRIPTION OF THE PREFERRED EMBODIMENTS

Figure 1:
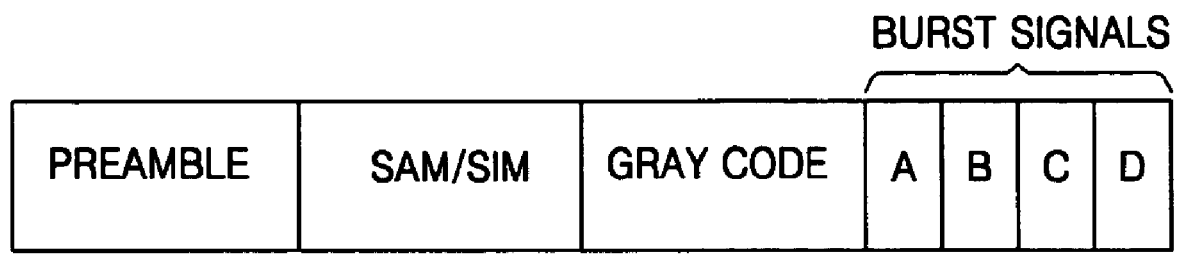
FIG. 1 is a diagram illustrating a pattern of servo information written on a disk of a conventional hard disk drive (HDD)
Figure 2:
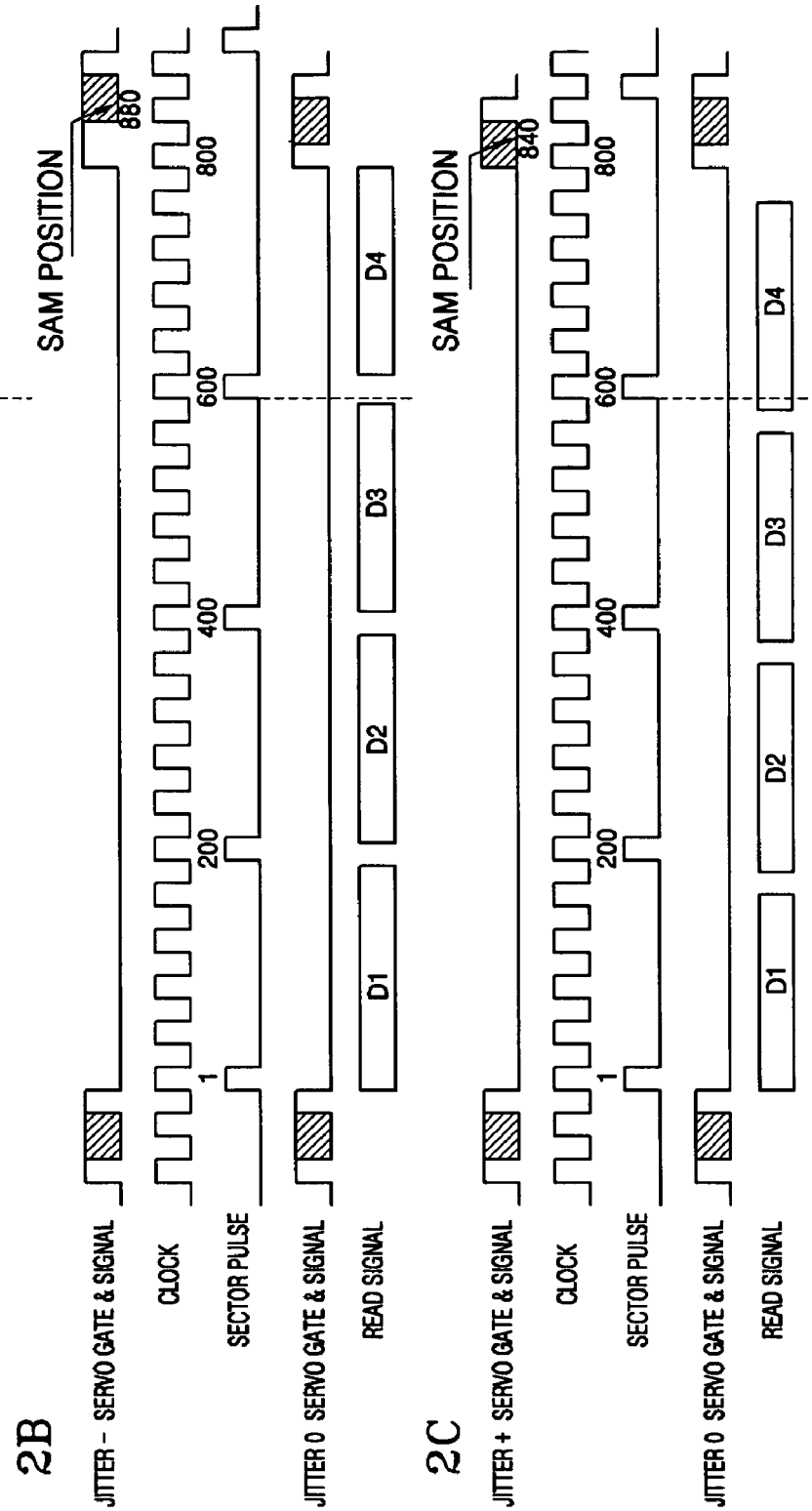
FIGS. 2A through 2C are timing diagrams of major signals for explaining timing misalignment due to spindle jitter in the conventional art.

Reference will now be made in detail to the embodiments of the present invention, examples of which are illustrated in the accompanying drawings, wherein like reference numerals refer to the like elements throughout. The embodiments are described below to explain the present invention by referring to the figures.

A hard disk drive (HDD) is a combination of electrical circuits and a head disk assembly (HDA) composed of mechanical components.

Figure 3:
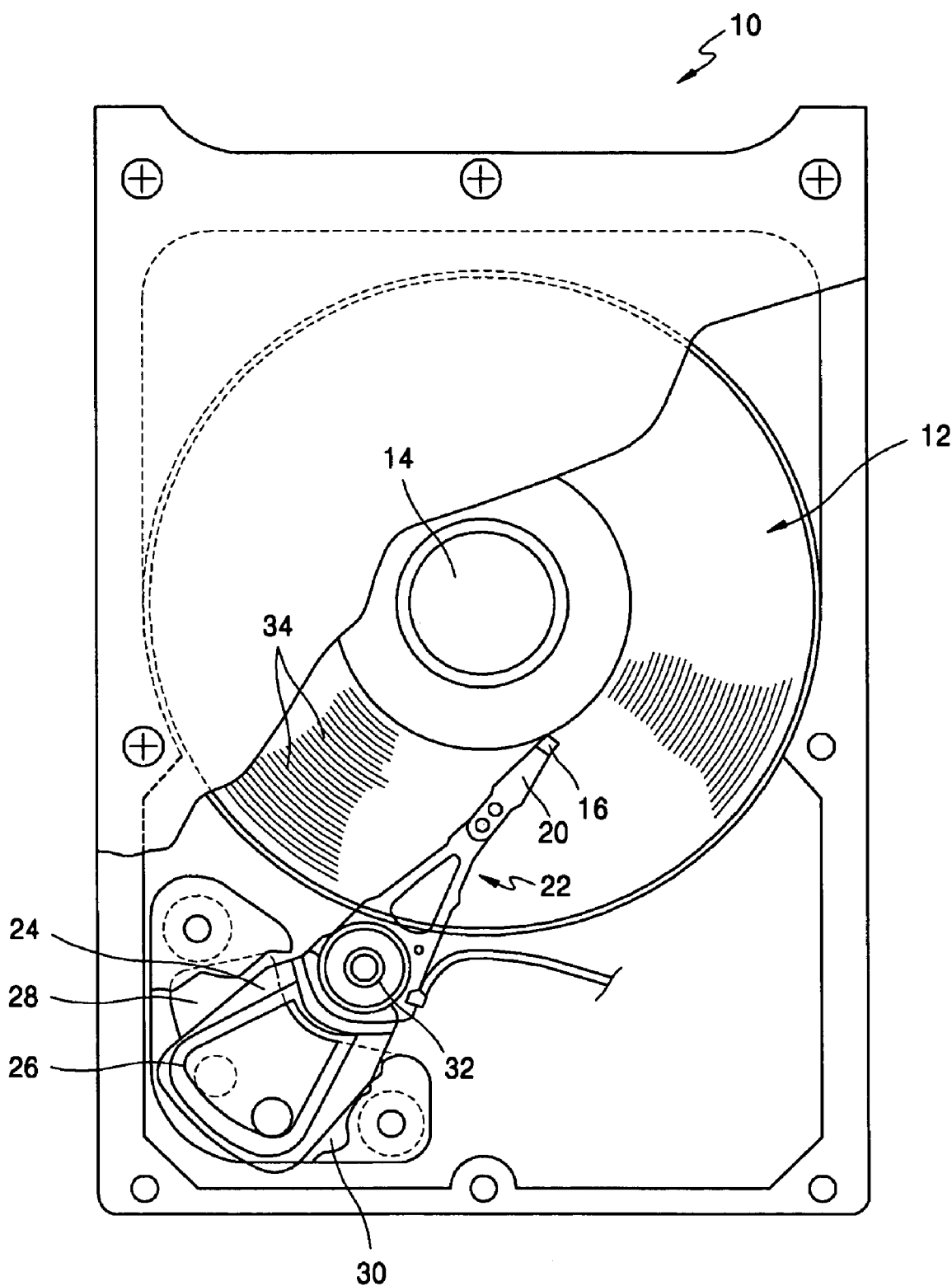
FIG. 3 is a top plan view of a head disk assembly (HDA) of a disk drive according to an aspect of the present invention.

FIG. 3 shows an HDA of an HDD according to an aspect of the present invention.

An HDA 10 includes at least one magnetic disk 12, which is rotated by a spindle motor 14. The disk drive further includes a transducer 16, which is slightly spaced from a disk surface 18.

The transducer 16 can read or write information on the rotating disk 12 sensing a magnetic field of the disk 12 or magnetizing the disk 12. Although the transducer 16 is illustrated as a single body in FIG. 3, it should be appreciated that the transducer 16 is divided into a write transducer for magnetizing the disk 12 and a separate read transducer for sensing the magnetic field of the disk 12. The read transducer may be constructed from a magneto-resistive element (MR). The transducer 16 is typically referred to as a head.

The transducer 16 may be integrated with a slider 20. The slider 20 generates an air bearing between the transducer 16 and the disk 12 surface. The slider 20 is coupled to a head gimbal assembly 22. The head gimbal assembly 22 is attached to an actuator arm 24 having a voice coil 26. The voice coil 26 is positioned adjacent to a magnetic assembly 28 to define a voice coil motor (VCM) 30. If current is supplied to the voice coil 26, a torque for rotating the actuator arm 24 about a bearing assembly 32 is generated. The actuator arm 24 rotates to cause the transducer 16 to traverse the disk surface 18.

Information is typically stored in annular tracks on the disk 12. Each track 34 generally includes a plurality of sectors. Each sector includes a data field and an identification field. The identification field contains a gray code that identifies sectors and tracks (cylinder). The transducer 16 traverses the disk 12 surface to read or write information on the track.

Figure 4:
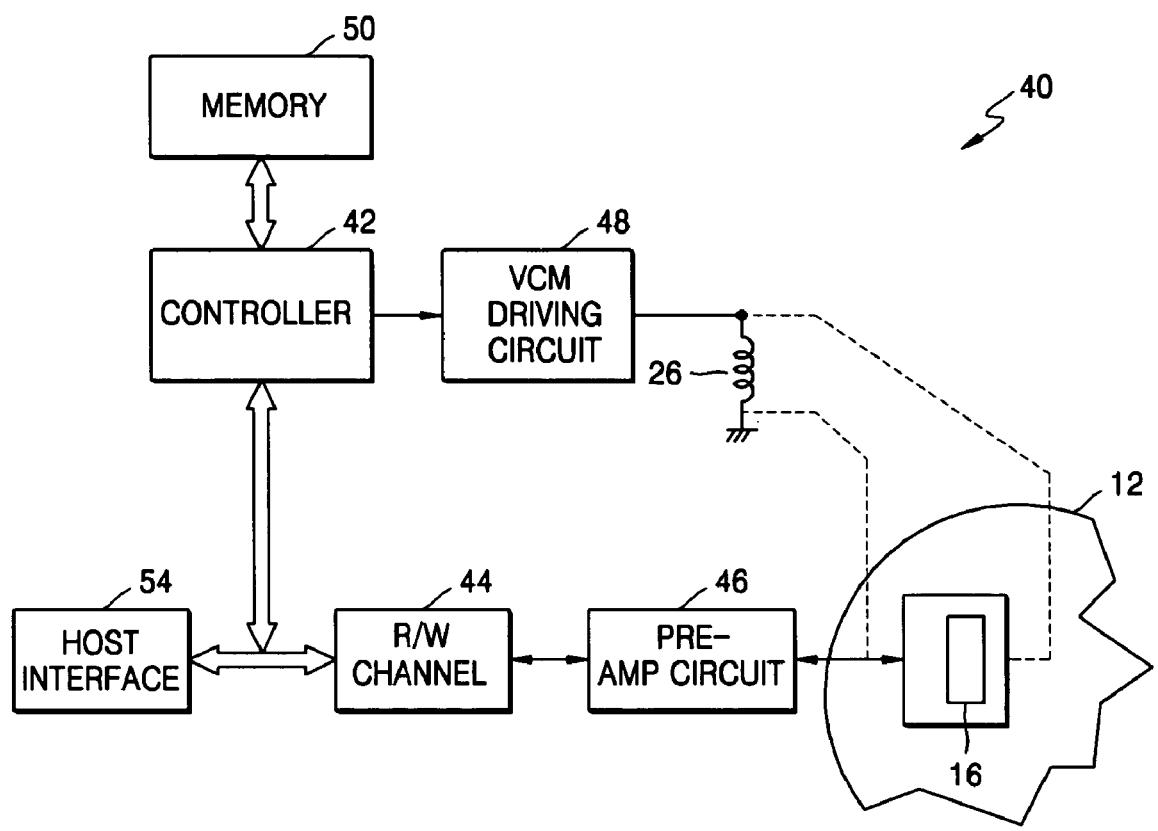
FIG. 4 is an electrical circuit diagram of a disk drive using a method of controlling the timing of servo pulses according to an aspect of the present invention.

FIG. 4 is a circuit diagram of an electrical system 40 for controlling an HDD. The electrical system 40 includes a controller 42, which is connected to the transducer 16 via a read/write (RAN) channel circuit 44 and a pre-amp circuit 46 according to an aspect of the present invention.

A digital signal processor (DSP), a microprocessor, a micro-controller, or the like can be used as the controller 42. The controller 42 controls the R/W channel circuit 44 to read information from the disk 12 or write information on the disk 12. The controller 42 generates a sector pulse, which indicates a position of a sector where data is written in a write mode and a position of a sector where data is read in a read mode, and also generates a servo gate pulse for obtaining a servo mark address signal.

The controller 42 is also connected to a VCM driving circuit 48 that supplies driving current to the voice coil 26. The controller 42 supplies a control signal to the VCM driving circuit 48 to control the excitation of the VCM 30 and the movement of the transducer 16.

Firmware for controlling the disk drive and various control data are stored in a memory 50.

First, the operation of a conventional disk drive will be explained below.

In a data read mode, a pre-amp circuit 46 amplifies an electrical signal sensed by the transducer 16 from the disk 12 to enable signal processing. Then, the R/W channel circuit 44 codes the signal read from the disk into a digital signal according to the timing of a sector pulse for read operation generated by the controller 42, converts the digital signal into stream data, and transmits the stream data to a host device (not shown) via a host interface circuit 54.

Next, in a write mode, the disk drive receives data from the host device via the host interface circuit 54. An internal buffer (not shown) of the interface circuit 54 temporarily stores the received data and sequentially outputs the stored data to the R/W channel circuit 44. The R/W channel circuit 44 converts the data into a binary data stream suitable for a writing channel of the disk 12. At a time when a sector pulse for a write operation is generated, the binary data stream is amplified by the pre-amp circuit 46, and then written on the disk 12 by the transducer 16.

The controller 42 according to an aspect of the present invention is designed to measure a spindle jitter value in a data write mode and/or a data read mode, and corrects the timing of the sector pulse and the servo gate pulse according to the measured spindle jitter value. Here, the spindle jitter value is obtained by measuring a servo address mark (SAM) detection cycle and calculating a difference between the measured cycle and a standard cycle. Methods of correcting the timing of the sector pulse and the servo gate pulse will be explained respectively in detail below with reference to flow charts in FIGS. 5 through 7.

The sector pulse indicates the timing at which data is written on a track in the data write mode, and indicates the timing at which data is read in the data read mode. The servo gate pulse is a window signal for detecting a SAM.

Figure 5:
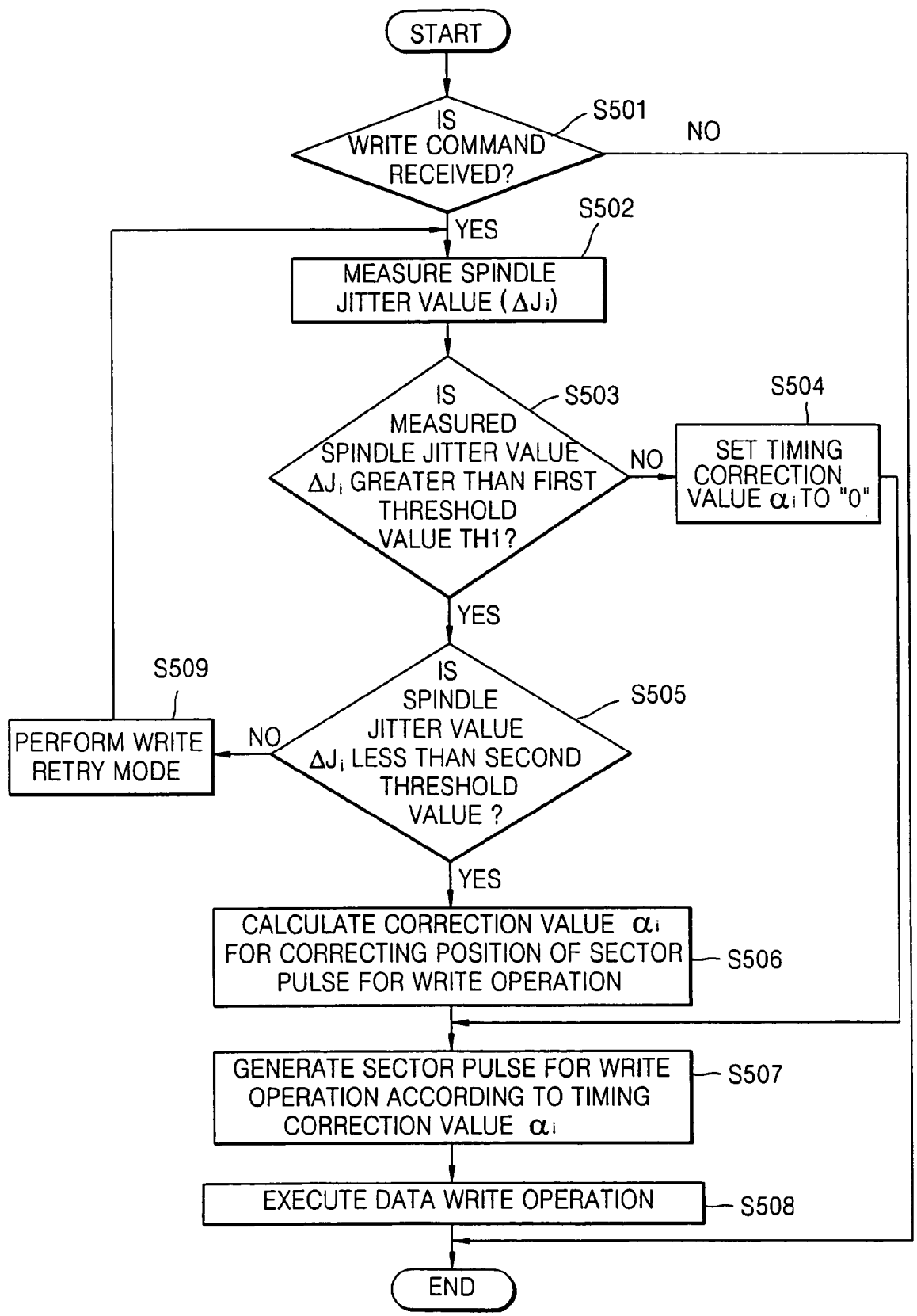
FIG. 5 is a flow chart of a method of controlling the timing of a sector pulse for write operation according to an aspect of the present invention.

Among the methods of controlling the timing of servo pulses according to an aspect of the present invention, a method of controlling the timing of the sector pulse in the write mode will be first explained in detail with reference to the circuit diagram of FIG. 4 and the flow chart of FIG. 5.

In operation S501, the controller 42 determines whether a write command is received from the host device through the host interface circuit 54.

If it is determined in operation S501 that the write command is received, the process goes to operation S502. In operation S502, the controller 42 measures a spindle jitter value $\Delta J_i$ using a SAM detection cycle.

In operation S503, the measured spindle jitter value $\Delta J_i$ is compared with a first threshold value TH1. Here, the first threshold value TH1 is a maximum allowable spindle jitter value that does not cause functional problems without timing correction of servo pulses.

If it is determined in operation S503 that the measured spindle jitter value $\Delta J_i$ is less than or equal to the first threshold value TH1, the process goes to operation S504. In operation S504, a timing correction value $\alpha_i$ of the sector pulse for write operation is set to "0". This means that spindle jitter has not been generated to a point where the timing of the sector pulse for the write operation needs to be corrected.

If it is determined in operation S503 that the measured spindle jitter value $\Delta J_i$ is greater than the first threshold value TH1, the process goes to operation S505. In operation S505, the measured spindle jitter value $\Delta J_i$ is compared with a second threshold value TH2. Here, the second threshold value TH2 is a maximum allowable spindle jitter value that can be compensated through timing correction.

If it is determined in operation S505 that the spindle jitter value $\Delta J_i$ is greater than or equal to the second threshold value TH2, the process goes to operation S509. In operation S509, the write operation that is being executed is stopped, and the disk is rotated a predetermined number of times, and then, a write retry mode is performed to execute the write operation again.

If it is determined in operation S505 that the measured spindle jitter value $\Delta J_i$ is less than the second threshold value TH2, the process goes to operation S506. In operation S506, a timing correction value $\alpha_i$ for correcting a position of the sector pulse for write operation is calculated. Here, the timing correction value $\alpha_i$ of the sector pulse for the write operation is designed to be proportional to the measured spindle jitter value $\Delta J_i$.

In operation S507, a sector pulse for the write operation is generated by reflecting the timing correction value $\alpha_i$ of the sector pulse for the write operation obtained through operations S504 and S506.

In operation S508, the data write operation is executed from a time when the sector pulse for the write operation is generated in operation S507.

FIG. 8A is a timing diagram illustrating that the sector pulse for the write operation is generated in a 200 clock cycle if the measured jitter value is less than the first threshold value TH1 and the timing correction value $\alpha_i$ is set to "0".

FIG. 8B is a timing diagram illustrating that the sector pulse for write operation is corrected in a 205 clock cycle if the measured spindle jitter value is a negative number between the first threshold value TH1 and the second threshold value TH2 and the timing correction value $\alpha_i$ is +5. It can be seen that a position of a sector pulse for read operation, which is generated in a 200 clock cycle, when the spindle jitter value is "0" during a data read operation is exactly aligned with a position of data written by a sector pulse for write operation, which is corrected in a 205 clock cycle.

FIG. 8C is a timing diagram illustrating that the sector pulse for write operation is corrected in a 195 clock cycle if the measured spindle jitter value is a positive number between the first threshold value TH1 and the second threshold value TH2 and the timing correction value $\alpha_i$ is −5. It can be seen that a position of a sector pulse for read operation, which is generated in a 200 clock cycle, when the spindle jitter value is "0" during the data read operation is exactly aligned with a position of data written by a sector pulse for write operation, which is corrected in a 195 clock cycle.

Figure 6:
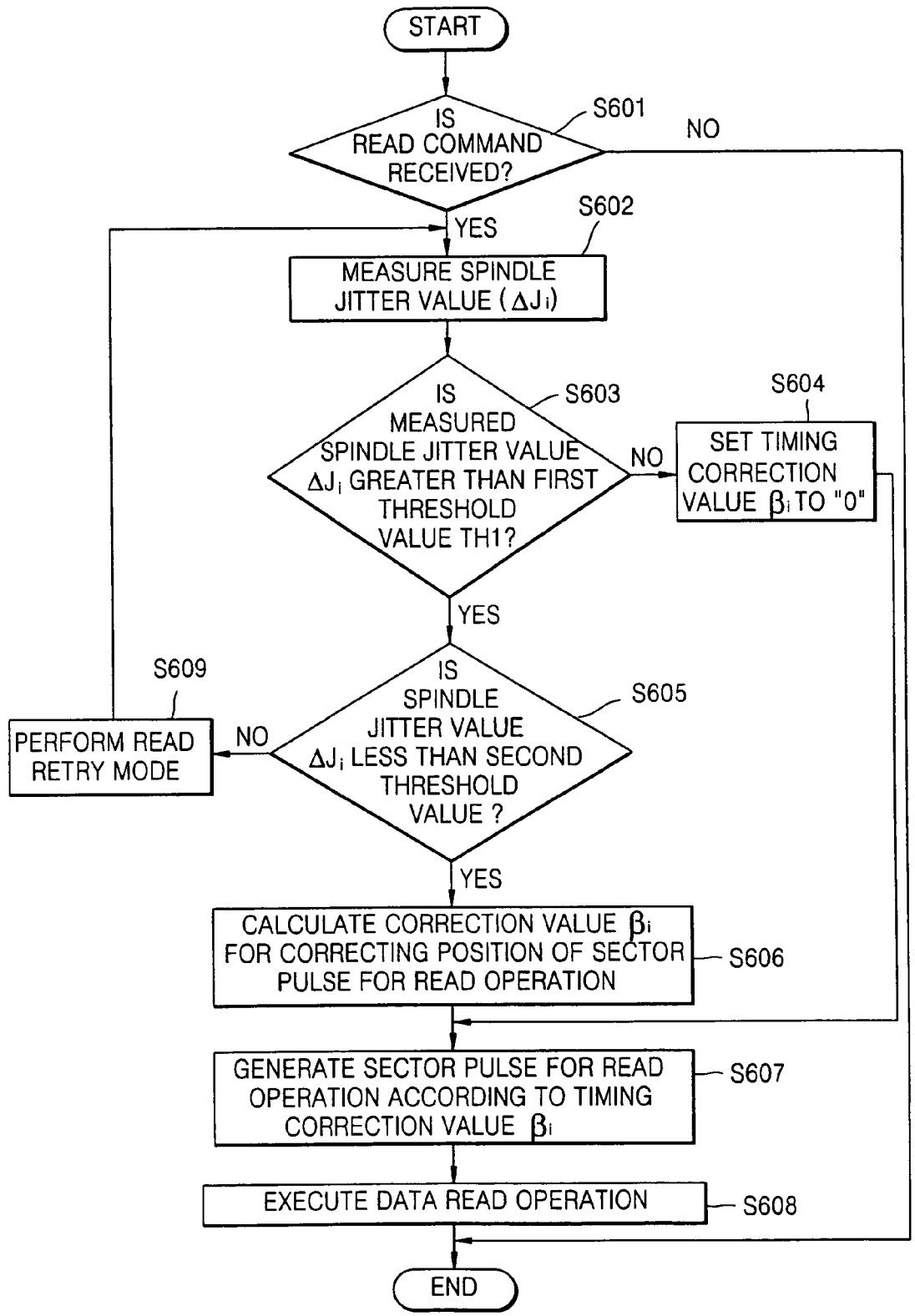
FIG. 6 is a flow chart of a method of controlling the timing of a sector pulse for read operation according to an aspect of the present invention.

Next, among the methods of controlling the timing of servo pulses according to the present invention, a method of controlling the timing of a sector pulse in a read mode will be explained in detail with reference to the circuit diagram of FIG. 4 and the flow chart of FIG. 6.

In operation S601, the controller 42 determines whether a read command is received from the host device through the interface circuit 54.

If it is determined in operation S601 that the read command is received, the process goes to operation S602. In operation S602, the controller 42 measures a spindle jitter value $\Delta J_i$ using a SAM detection cycle.

In operation S603, the measured spindle jitter value $\Delta J_i$ is compared with a first threshold value TH1. Here, the first threshold value TH1 is a maximum allowable spindle jitter value that does not cause functional problems without timing correction in the HDD.

If it is determined in operation S603 that the measured spindle jitter value $\Delta J_i$ is less than or equal to the first threshold value TH1, the process goes to operation S604. In operation S604, a timing correction value $\beta_i$ of a sector pulse for read operation is set to "0". This means that spindle jitter has not been generated to a point where the timing of the sector pulse for the read operation needs to be corrected.

If it is determined in operation S603 that the measured spindle jitter value $\Delta J_i$ is greater than the first threshold value TH1, the process goes to operation S605. In operation S605, the measured spindle jitter value $\Delta J_i$ is compared with a second threshold value TH2. Here, the second threshold value TH2 is a maximum allowable spindle jitter value that can be compensated through timing correction.

If it is determined in operation S605 that the measured spindle jitter value $\Delta J_i$ is greater than or equal to the second threshold value TH2, the process goes to operation S609. In operation S609, the read operation that is being executed is stopped, and the disk is rotated a predetermined number of times, and then, a read retry mode is performed to execute the read operation again.

If it is determined in operation S605 that the measured spindle jitter value $\Delta J_i$ is less than the second threshold value TH2, the process goes to operation S606. In operation S606, a timing correction value $\beta_i$ for correcting a position of the sector pulse for read operation is calculated. Here, the timing correction value $\beta_i$ of the sector pulse for the read operation is designed to be proportional to the measured spindle jitter value $\Delta J_i$.

In operation S607, a sector pulse for the read operation is generated by reflecting the timing correction value $\beta_i$ of the sector pulse for the read operation obtained through operations S604 and S606.

In operation S608, the data read operation is executed from a time when the sector pulse for the read operation is generated in operation S607.

In this manner, although spindle jitter is generated, the timing of the sector pulses for write and read operations can be exactly corrected according to the value of the generated spindle jitter.

Figure 7:
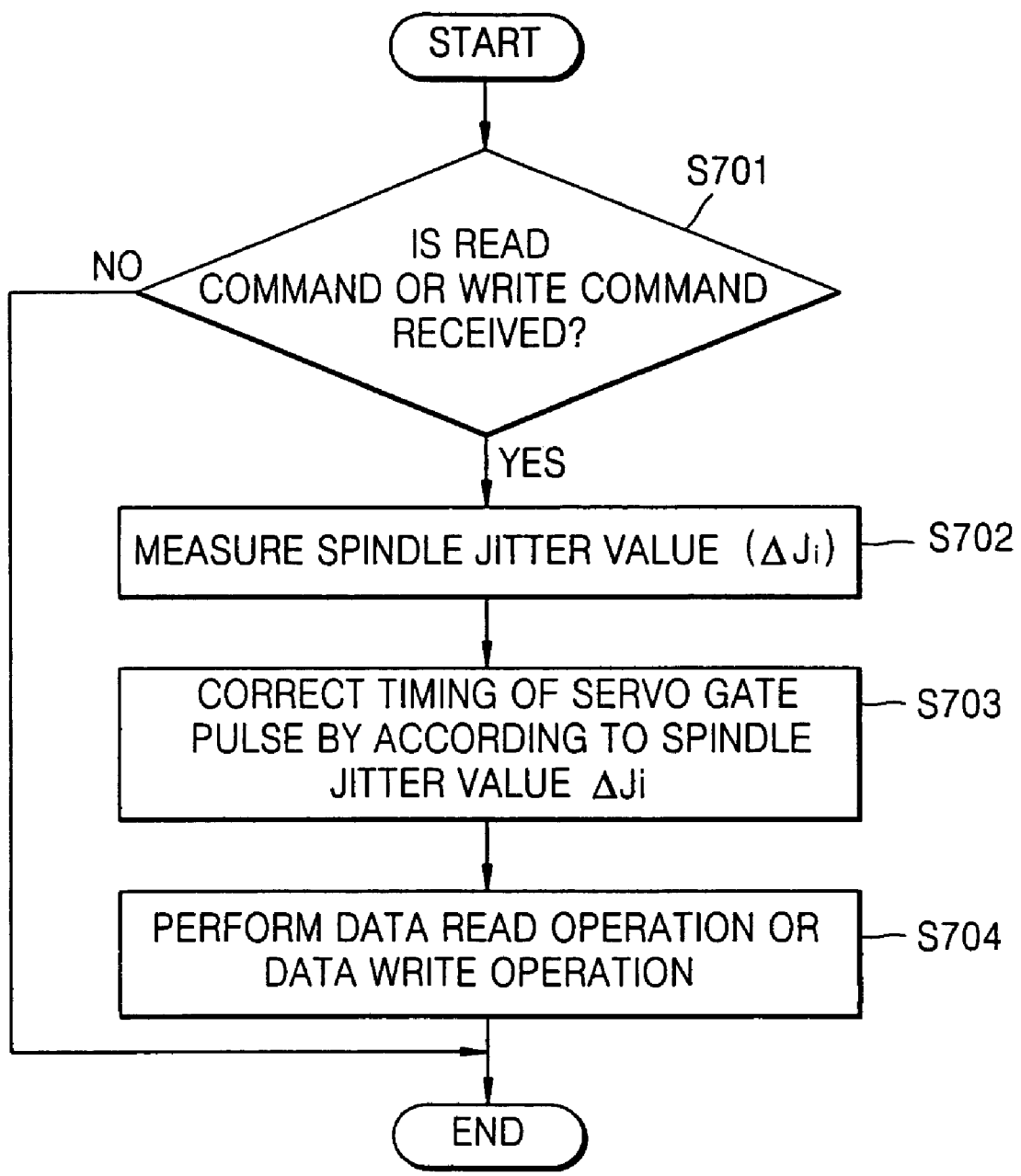
FIG. 7 is a flow chart of a method of controlling the timing of a servo gate pulse according to an aspect of the present invention.

Finally, among the methods of controlling the timing of servo pulses according to an aspect of the present invention, a method of controlling the timing of a servo gate pulse in a write mode and a read mode will be explained in detail with reference to the circuit diagram of FIG. 4 and the flow chart of FIG. 7.

In operation S701, the controller 42 determines whether a write command or read command is received from the host device through the host interface circuit 54.

If it is determined in operation S701 that the write command or read command is received, the process goes to operation S702. In operation S702, the controller 42 measures a spindle jitter value $\Delta J_i$ using a SAM detection cycle.

Next, in operation S703, the timing of a servo gate pulse, which is used for obtaining a SAM, is corrected by reflecting the measured spindle jitter value $\Delta J_i$. The method of correcting the timing of the servo gate pulse can be performed using the same principle as used in the above methods of correcting the timing of the sector pulses.

Next, in operation S704, the data read operation or data write operation is performed.

In this manner, although spindle jitter is generated, the timing of the servo gate pulse can be exactly corrected according to the value of the generated spindle jitter.

Since the timing of the sector pulse and the servo gate pulse is corrected according to the value of the generated spindle jitter although spindle jitter is generated in the data write and read modes, the data write and read operations can be executed without errors even when the rotational speed of the disk is changed.

The present invention can be executed as a method, an apparatus, a system, and so on. When the present invention is executed as software, elements of the present invention are code segments that perform indispensable operations. The programs or code segments can be stored in a processor-readable medium or transmitted by a computer data signal embodied in a carrier wave over a transmission medium or a communication network. The processor-readable medium includes any medium that can store or transmit information. The processor-readable medium may include an electronic circuit, a semiconductor memory device, a read-only memory (ROM), a flash memory, an erasable ROM (EROM), a floppy disk, an optical disk, a hard disk, a fiber-optic medium, a radio frequency (RF) network system, etc. The computer data signal includes any signal that can be transmitted over a transmission media, e.g., an electronic network channel, an optical fiber, air, an electronic system, and an RF network.

While the present invention has been particularly shown and described with reference to exemplary embodiments thereof, it will be understood by those of ordinary skill in the art that various changes in form and details may be made therein without departing from the spirit and scope of the present invention as defined by the following claims. Accordingly, it is obvious that the present invention is not limited to specific constructions or arrangements but can be applied to various kinds of disk drives including HDDs.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling the timing of a sector pulse for a write operation in a disk drive, the method comprising:
   measuring a spindle jitter value;
   generating a timing correction value of a sector pulse, which indicates a position of a sector where data is written, according to the measured spindle jitter value; and
   generating a sector pulse in accordance with the timing correction value of the sector pulse,
   wherein the operation of generating the timing correction value comprises:
   comparing the measured spindle jitter value with a first threshold value;
   if it is determined that the measured spindle jitter value is less than or equal to the first threshold value, setting the timing correction value of the sector pulse to "0";
   if it is determined that the measured spindle jitter value is greater than the first threshold value, comparing the measured spindle jitter value with a second threshold value; and
   if it is determined that the measured spindle jitter value is less than the second threshold value, calculating a timing correction value of a sector pulse that corresponds to the measured spindle jitter value, and if it is determined that the measured spindle jitter value is greater than or equal to the second threshold value, performing a write retry mode.

2. A method of controlling the timing of a sector pulse for a read operation in a disk drive, the method comprising:
   measuring a spindle jitter value;
   generating a timing correction value of a sector pulse, which indicates a position of a sector where data is read, according to the measured spindle jitter value; and
   generating a sector pulse in accordance with the timing correction value of the sector pulse,
   wherein the operation of generating the timing correction value comprises:
   comparing the measured spindle jitter value with a first threshold value;
   if it is determined that the measured spindle jitter value is less than or equal to the first threshold value, setting the timing correction value of the sector pulse to "0";
   if it is determined that the measured spindle jitter value is greater than the first threshold value, comparing the measured spindle jitter value with a second threshold value; and
   if it is determined that the measured spindle jitter value is less than the second threshold value, calculating a timing correction value of a sector pulse that corresponds to the measured spindle jitter value, and if it is determined that the measured spindle jitter value is greater than or equal to the second threshold value, performing a read retry mode.

3. A method of controlling the timing of a servo gate pulse in a disk drive, the method comprising:
   measuring a spindle jitter value in a data write mode and a data read mode; and
   generating a timing correction value of a sector pulse, which indicates a position of a sector where data is read, according to the measured spindle jitter value;
   generating a sector pulse in accordance with the timing correction value of the sector pulse, and correcting the timing of a servo gate pulse, which is used for obtaining servo information,
according to the measured spindle jitter value,
wherein the operation of generating the timing correction value comprises:
comparing the measured spindle jitter value measured with a first threshold value;
if it is determined that the measured spindle jitter value is less than or equal to the first threshold value, setting the timing correction value of the sector pulse to "0";
if it is determined that the measured spindle jitter value is greater than the first threshold value, comparing the measured spindle jitter value with a second threshold value; and
if it is determined that the measured spindle jitter value is less than the second threshold value, calculating a timing correction value of a sector pulse that corresponds to the measured spindle jitter value, and if it is determined that the measured spindle jitter value is greater than or equal to the second threshold value, performing a read retry mode.

4. The method of claim 3, wherein the servo information includes a servo address mark signal.

5. A method of controlling the timing of a sector pulse for a disk drive, the method comprising:
measuring a spindle jitter value;
generating a timing correction value of a sector pulse, which indicates a position of a sector where data is written, according to the measured spindle jitter value; and
generating a sector pulse using the timing correction value of the sector pulse,
wherein the operation of generating the timing correction value comprises:
comparing the measured spindle jitter value with a first threshold value and a second threshold value;
setting the timing correction value of the sector pulse to "0", if the measured spindle jitter value is less than or equal to the threshold value; and generating the timing correction value of the sector pulse corresponding to the measured spindle jitter value if it is determined that the measured spindle jitter value is greater than the first threshold value and less than the second threshold value.

6. A disk controller to control the timing of a sector pulse for write operation in a disk drive, the disk controller comprising:

a spindle jitter value detector;
a generator to generate a timing correction value of a sector pulse, which indicates a position of a sector where data is written, according to the measured spindle jitter value; and to generate a sector pulse using the timing correction value of the sector pulse,
wherein the operation of generating the timing correction value comprises:
comparing the measured spindle jitter value with a first threshold value and a second threshold value;
setting the timing correction value of the sector pulse to "0" if the measured spindle jitter value is less than the first threshold value;
generating the timing correction value of the sector pulse corresponding to the measured spindle jitter value if it is determined that the measure spindle jitter value is greater than the first threshold value and less than or equal to the second threshold value.

7. A method of controlling the timing of a sector pulse for write operation in a disk drive, the method comprising:
measuring a spindle jitter value; and
generating a timing correction value of a sector pulse which indicates a position of a sector where data is written according to the measured spindle jitter value,
wherein the operation of generating the timing correction value comprises:
comparing the measured spindle jitter value measured with a first threshold value;
if it is determined that the measured spindle jitter value is less than or equal to the first threshold value, setting the timing correction value of the sector pulse to "0";
if it is determined that the measured spindle jitter value is greater than the first threshold value, comparing the measured spindle jitter value with a second threshold value; and
if it is determined that the measured spindle jitter value is less than the second threshold value, calculating a timing correction value of a sector pulse that corresponds to the measured spindle jitter value, and if it is determined that the measured spindle jitter value is greater than or equal to the second threshold value, performing a write retry mode.

8. The method of claim 7, further comprising:
generating a sector pulse in accordance with the timing correction value of the sector pulse.

* * * * *

UNITED STATES PATENT AND TRADEMARK OFFICE
CERTIFICATE OF CORRECTION

| | |
|---|---|
| PATENT NO. | : 7,440,211 B2 |
| APPLICATION NO. | : 11/129390 |
| DATED | : October 21, 2008 |
| INVENTOR(S) | : Jae-deog Cho et al. |

It is certified that error appears in the above-identified patent and that said Letters Patent is hereby corrected as shown below:

Column 10, Line 16, change "measure" to --measured--.

Signed and Sealed this

Tenth Day of February, 2009

JOHN DOLL
*Acting Director of the United States Patent and Trademark Office*